United States Patent
Kim et al.

(10) Patent No.: US 12,181,446 B2
(45) Date of Patent: Dec. 31, 2024

(54) BATTERY MODULE SIMULATION SYSTEM AND METHOD

(71) Applicant: LG ENERGY SOLUTION, LTD., Seoul (KR)

(72) Inventors: Dong Wook Kim, Daejeon (KR); Jae Yeong Kim, Daejeon (KR); Yong Il Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 196 days.

(21) Appl. No.: 17/802,739

(22) PCT Filed: Jul. 21, 2021

(86) PCT No.: PCT/KR2021/009384
§ 371 (c)(1),
(2) Date: Aug. 26, 2022

(87) PCT Pub. No.: WO2022/035080
PCT Pub. Date: Feb. 17, 2022

(65) Prior Publication Data
US 2023/0120644 A1  Apr. 20, 2023

(30) Foreign Application Priority Data
Aug. 11, 2020 (KR) .................. 10-2020-0100702

(51) Int. Cl.
*G01N 3/12* (2006.01)
*G01N 3/18* (2006.01)
*H01M 10/42* (2006.01)

(52) U.S. Cl.
CPC ............... *G01N 3/12* (2013.01); *G01N 3/18* (2013.01); *H01M 10/4285* (2013.01)

(58) Field of Classification Search
CPC ....... G01N 3/12; G01N 3/18; H01M 10/4285; Y02E 60/10; G01R 31/3644
See application file for complete search history.

(56) References Cited

U.S. PATENT DOCUMENTS

2013/0330577 A1* 12/2013 Kristofek ............ H01M 10/441
429/61
2014/0178720 A1* 6/2014 Rentzsch ............ G01R 31/387
324/426
(Continued)

FOREIGN PATENT DOCUMENTS

CN 110416645 A 11/2019
JP 5605344 B2 10/2014
(Continued)

OTHER PUBLICATIONS

Japanese Office Action issued in application No. 2022-550815 dated Nov. 6, 2023.
(Continued)

*Primary Examiner* — Xin Y Zhong
(74) *Attorney, Agent, or Firm* — MORGAN, LEWIS & BOCKIUS LLP

(57) ABSTRACT

The present invention relates to a battery module simulation system and method for easily implementing pressure and temperature conditions in a battery module by easily changing the pressure and temperature applied to a battery cell in a pressure measurement test of the battery cell.

10 Claims, 2 Drawing Sheets

(56) References Cited

U.S. PATENT DOCUMENTS

| | | | |
|---|---|---|---|
| 2015/0171485 A1* | 6/2015 | Rawlinson | B60L 50/64 |
| | | | 429/62 |
| 2016/0064972 A1 | 3/2016 | Stefanopoulou et al. | |
| 2016/0181674 A1 | 6/2016 | Kristofek et al. | |
| 2017/0045378 A1 | 2/2017 | Fukuda et al. | |
| 2017/0074634 A1* | 3/2017 | Yoon | G01B 11/06 |
| 2018/0226698 A1 | 8/2018 | Lin et al. | |
| 2021/0025771 A1 | 1/2021 | Park et al. | |
| 2023/0118071 A1* | 4/2023 | Laramie | H01M 10/425 |
| | | | 429/7 |

FOREIGN PATENT DOCUMENTS

| | | |
|---|---|---|
| JP | 2015-527691 A | 9/2015 |
| KR | 10-2014-0034811 A | 3/2014 |
| KR | 10-2015-0043291 A | 4/2015 |
| KR | 10-2016-0063278 A | 6/2016 |
| KR | 10-1660443 B1 | 9/2016 |
| KR | 10-2017-0009992 A | 1/2017 |
| KR | 10-2017-0049549 A | 5/2017 |
| KR | 10-1741193 B1 | 5/2017 |
| KR | 10-1783923 B1 | 10/2017 |
| KR | 10-2018-0100748 A | 9/2018 |
| KR | 10-2019-0069882 A | 6/2019 |
| KR | 10-1988745 B1 | 6/2019 |
| KR | 10-2020-0046633 A | 5/2020 |

OTHER PUBLICATIONS

International Search Report (with translation) and Written Opinion dated Nov. 2, 2021 issued in corresponding International Patent Application No. PCT/KR2021/009384.
Office Action issued in KR application 10-2020-0100702 dated May 24, 2024.
Extended European Search Report dated May 7, 2024 issued in European Patent Application No. 21856086.0.

* cited by examiner

[FIG. 1]

BATTERY MODULE SIMULATION SYSTEM AND METHOD

TECHNICAL FIELD

This application claims the benefit of priority based on Korean Patent Application No. 10-2020-0100702, filed on Aug. 11, 2020, and the entire contents of the Korean patent application are incorporated herein by reference.

The present invention relates to a system and method for simulating a battery module, and more particularly, to a battery module simulation system and method capable of implementing load and temperature conditions of a battery module in a pressure measurement test of a battery cell.

BACKGROUND ART

In recent years, as the price of energy sources increases due to the depletion of fossil fuels and the interest of environmental pollution is amplified, the demand for environmentally friendly alternative energy sources has become an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

Such a secondary battery is formed in a structure such that an electrode assembly including a positive electrode, a negative electrode, and a separator disposed therebetween is built in a battery case, and positive and negative electrode tabs are welded to two electrode leads and are sealed to be exposed to the outside of the battery case. The electrode tab is electrically connected to the external device through contact with the external device, and the secondary battery supplies power to the external device through the electrode tab or receives power from the external device.

As the battery is operated in an abnormal state by overcharge, overdischarge, overheating, and external impact, etc., gas may be generated inside the secondary battery. For example, overheated battery may generate gas and promote the decomposition reaction of battery elements, thereby causing continuous heating, gas generation, and a swelling phenomenon. This phenomenon also appears in the slow deterioration process of secondary batteries due to long-term use. As such, in order to manufacture a battery cell having uniform charge/discharge characteristics, it is necessary to measure the pressure change according to the volume change of the battery cell.

Conventionally, a dedicated device was used to measure the pressure change of the battery cell. However, since the conventional equipment for measuring the pressure of battery cells has a large weight and volume, there is a spatial limitation in the battery evaluation. Further, it was difficult for the pressure measurement jig to implement load and temperature conditions of an actual battery module.

DISCLOSURE

Technical Problem

In order to solve the problems of the prior technology, an object of the present invention is to provide a battery module simulation system and method for implementing load and temperature conditions of a battery module in a pressure measurement test of a battery cell.

Technical Solution

The present invention provides a system for simulating a battery module. In one embodiment, a system for simulating a battery module according to the present invention includes: a case which accommodates a battery cell therein; a charge/discharge unit which is electrically connected to the battery cell; a tube which is stacked on one surface of the battery cell and has a structure into which a fluid flows; a fluid supply unit which is fluidly connected to the tube, and supplies a fluid to the tube to thereby apply pressure to the battery cell; a temperature controller which controls a temperature of the fluid which has flowed into the tube; and a sensor unit which is disposed between the tube and one surface of the case and measures a pressure inside the case.

In another embodiment, in the system, n tubes are disposed as a single layer on one surface of the battery cell. Herein, the n is an integer equal to or greater than 2. At this time, each of the n tubes may include a valve which controls an inflow of the fluid, and each of the n tubes may include a temperature controller which controls a temperature of the fluid.

In further another embodiment, the system for simulating a battery module according to the present invention further includes: an output unit which is connected to the sensor unit and outputs a pressure value of an inside of the case; and a storage unit which stores the pressure value.

In one embodiment, the case of the system for simulating a battery module according to the present invention further includes first and second compression pads disposed on two surfaces of the battery cell, respectively.

Further, the tube may be made of a soft or elastic material, and the fluid flowing into the tube may be in a liquid or gel state. Further, the sensor unit may include a pressure sensor of a planar structure.

Further, the present invention provides a method of simulating a battery module using the above described system for simulating a battery module. In one embodiment, the method of simulating a battery module according to the present invention includes: setting an inflow and a temperature of a fluid flowing into a tube of a system for simulating a battery module, to thereby apply a pressure and a temperature to a battery cell; and inducing a swelling of the battery cell according to charge and discharge and measuring a pressure inside a case.

Further, the method further includes setting an inflow and a temperature of a fluid flowing into n tubes as the n tubes are disposed as a single layer on one surface of the battery cell of the system. Herein, the n is an integer equal to or greater than 2.

Advantageous Effects

According to the battery module simulation system and method of the present invention, it is possible to easily change the pressure and temperature applied to the battery cell at the pressure measurement test of the battery cell, and accordingly, it is possible to easily implement pressure and temperature conditions in a battery module.

DETAILED DESCRIPTION OF THE PREFERRED EMBODIMENTS

Figure 1:
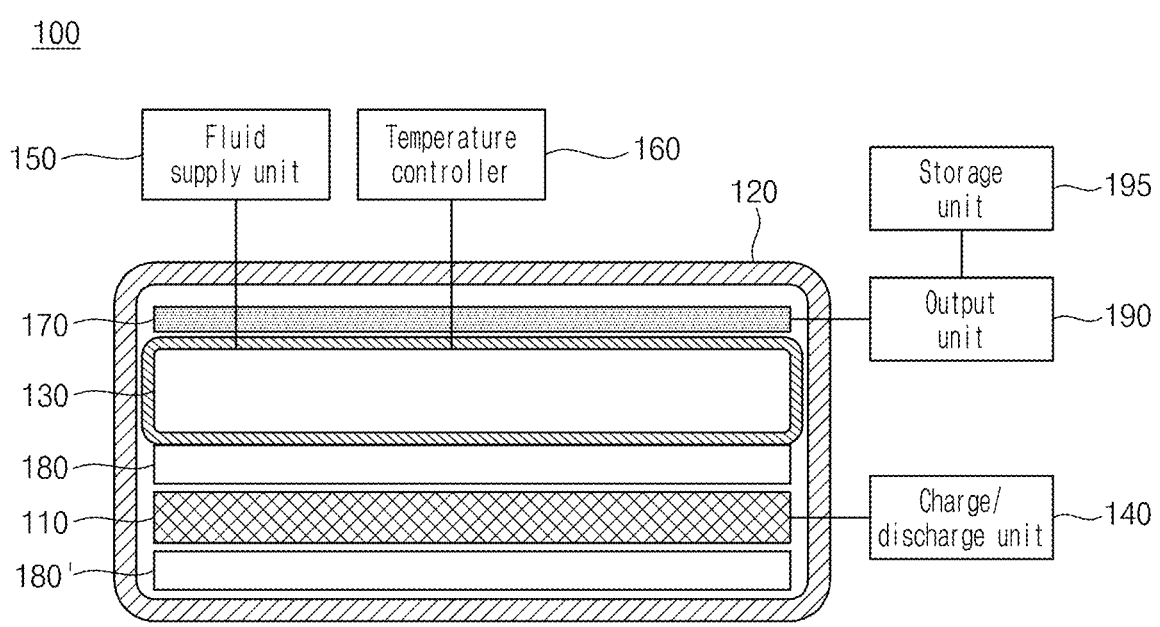
FIG. 1 is a schematic diagram showing a system for simulating a battery module according to one embodiment of the present invention.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a system and method for simulating a battery module. First, a system for simulating a battery module according to the present invention includes: a case which accommodates a battery cell therein; a charge/discharge unit which is electrically connected to the battery cell; a tube which is stacked on one surface of the battery cell and has a structure into which a fluid flows; a fluid supply unit which is fluidly connected to the tube, and supplies a fluid to the tube to thereby apply pressure to the battery cell; a temperature controller which controls a temperature of the fluid which has flowed into the tube; and a sensor unit which is disposed between the tube and one surface of the case and measures a pressure inside the case.

The pressure measurement jig for measuring the pressure change of the conventional battery cell has a large weight and volume, and accordingly, there is a spatial limitation in the battery evaluation. Further, it was difficult for the pressure measurement jig to implement load and temperature conditions of an actual battery module.

As such, the inventors of the present invention have invented a battery module simulation system and method for implementing load and temperature conditions of a battery module in a battery cell measuring apparatus. More specifically, the battery module simulation system and method according to the present invention includes a laminated structure of a tube which has a structure where a battery cell is accommodated in a case, and a fluid flows in on one surface of the battery cell. At this time, since the tube can adjust the amount and temperature of a fluid flowing into the tube, the battery module simulation system and method according to the present invention can implement the load and temperature of the actual battery module.

In one embodiment, the battery module simulation system according to the present invention includes a case for accommodating battery cells therein. The case means a housing for accommodating battery cell, and it includes an accommodation space for accommodating battery cells in the case. On the other hand, the battery cell may be accommodated to allow the bottom surface of the case and the bottom surface of the battery cell to be horizontal. In another example, one surface of the case may be opened, and a cover may be welded on one surface of the case. Herein, one surface of the case means one wall in the case and means a case wall located in the lamination direction of the battery.

In one embodiment, the battery cell may be a pouch-type unit cell. On the other hand, if the battery cell is a secondary battery capable of charging and discharging, it is not particularly limited. In a specific example, the battery cell is a pouch type unit cell, and an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

In one embodiment, the battery module simulation system according to the present invention includes a compression pad. In a specific example, the case has first and second compression pads therein, and the first and second compression pads are disposed on two surfaces of the battery cell, respectively. The compressed pads are used to similarly simulate the rigidity conditions of the battery cell periphery in the battery module. In a specific example, the compression pad may be made of a polyurethane series material, and when thickness is modified by the swelling phenomenon of the battery cell, the change in the battery cell by the external impact may be absorbed.

In one embodiment, the battery module simulation system according to the present invention includes a tube. In the present invention, "tube" means a structure that is stacked on one surface of a battery cell housed in the case. The tube may have a flat form that may be laminated on the battery cell, and it is preferable to cover the front surface of the battery cell. In particular, the fluid may be flowed into the tube, and the pressure or load applied to the battery cell may be controlled by controlling the inflow of the fluid. Further, the temperature of the fluid, which has flowed into the tube, may also be controlled, thereby controlling the temperature, etc. of the battery cell accommodated in the case. For example, it is possible to simulate the temperature and pressure at the swelling test in a battery cell by allowing a fluid to flow into the tube and controlling the temperature of the fluid. Specific explanations are described later.

The tube may be made of a soft or elastic material. For example, the tube may be made of a rubber material. Further, the tube may have a flat form so that it may be easily laminated on one surface of the battery cell.

Furthermore, the fluid flowing into the tube may be a in a liquid or gel state. For example, the fluid may be water or a heat transfer fluid. In a specific example, it is possible to control pressure or load applied to a battery cell and at the same time, it is also possible to easily control the temperature applied to the battery cell by filling the heat transfer fluid or water in the tube.

In another example, the battery module simulation system according to the present invention includes n tubes (n is an integer equal to or greater than 2). In a specific example, in the battery module simulation system of the present invention, n tubes are disposed as a single layer on one surface of the battery cell. Herein, the n is an integer equal to or greater than 2. At this time, it is preferable that n tubes are disposed to be distributed in the entire area of the battery cell. For example, the number n of the tubes is in the range of 2 to 40, 2 to 30 or 2 to 20.

In another embodiment, the n tubes are fluidly connected to the fluid supply unit, respectively, and include a valve for controlling the inflow of a fluid flowing into each of the tubes, respectively. Namely, it is possible to differently set pressures applied to respective regions of the battery cell by individually configuring the tube and individually setting the inflow of the fluid flowing into each tube.

Furthermore, the n tubes may include a temperature controller for controlling the temperature of the fluid, respectively. As such, it is possible to differently set temperatures applied to respective regions of the battery cell by individually configuring the tube and individually setting the temperature of the fluid flowing into each tube. Namely, the present invention can simulate a battery module by granting conditions in a module state while changing the temperature and pressure conditions by regions of a battery cell.

In one embodiment, the battery module simulation system according to the present invention includes a fluid supply unit which is fluidly connected to a tube, supplies a fluid to the tube, and applies pressure to the battery cell. The fluid supply unit is a device for supplying a fluid into a tube or discharging a fluid from the tube, and may be a general fluid pump. Further, the fluid supply unit further includes a valve for controlling an inflow of a fluid flowing into the tube. The valve may be a general fluid control valve. The inflow of the fluid may be set by the fluid control valve.

In one embodiment, the battery module simulation system according to the present invention includes a temperature controller for controlling the temperature of a fluid flowing into a tube. The temperature controller may be a heater and may easily control the temperature of the fluid accommodated in the tube to a desired temperature through a temperature sensor attached on the tube. Namely, the pressure and the temperature applied to the battery cell can be controlled by controlling the inflow and the temperature of the fluid accommodated in the tube. In another embodiment, the n tubes may include a temperature controller for controlling the temperature of the fluid, respectively.

Further, the temperature controller may control the temperature of the fluid accommodated in the tube, or the temperature controller may be connected to the fluid supply unit to thereby control the temperature of the fluid supplied to the tube and then allow the fluid to flow into the tube.

In one embodiment, the battery module simulation system according to the present invention includes a sensor unit. Specifically, the sensor unit may be disposed between the tube and one surface of the case to thereby measure the internal pressure of the case. Specifically, the sensor unit includes a pressure sensor having a planar structure. The pressure sensor having the planar structure may be disposed on the front surface of the battery tube. As such, even if the pressure increases only on a partial region of the entire area of the tube or the battery cell, the pressure in the case can be easily sensed.

For example, the pressure sensor may be a pressure distribution measurement sensor. The pressure distribution measurement sensor is a film-type pressure sensor and can simultaneously measure the pressure applied to thousands of sensor surfaces to thereby identify the shape of the pressure distribution. Then, analog signals of such a pressure distribution shape can be converted into digital signals, and the digital signals can be transmitted to a PC.

In a specific example, the battery module simulation system of the present invention sets the pressure and the temperature applied to the battery cell by injecting a fluid into the tube and controlling the temperature of the fluid in the tube. Further, the changed pressure in the case can be measured according to the inflow and the temperature of the fluid flowing into the tube.

More specifically, the battery module simulation system of the present invention applies a predetermined pressure and temperature to battery cells accommodated in a case by controlling the inflow and the temperature of the fluid inside the tube with the fluid supply unit and the temperature controller. The swelling of the battery cell is induced by the charge/discharge unit which is electrically connected to the battery cell in a state that pressure and temperature have been applied to the battery cell. Further, the sensor unit can sense the pressure changed by the swelling of the battery cell.

On the other hand, the charge/discharge unit may supply power for charge to battery cells and receive discharge power from the battery cells. Herein, supplying power to the battery cells is not limited to supplying power which is sufficient for fully charging the battery cells. The same may be applied to the meaning of receiving discharge power from the battery cells, and thus repeated description thereof is omitted here.

Further, the system for simulating a battery module according to the present invention further includes an output unit which is connected to the sensor unit and outputs a pressure value of an inside of the case, and a storage unit which stores the pressure value. Specifically, the output unit may numerically calculate and display a change in the pressure applied from the battery cell based on a signal inputted from the sensor unit. In addition, the storage unit may receive and store the pressure value or the output value of the battery cell, and may store information on the swelling result of the battery cell to make the information as a database. For example, information on pressure values for the temperature condition and the inflow of the fluid flowing into the tube or operation conditions of the charge/discharge unit may be made and stored as a table or a graph.

Further, the present invention provides a method of simulating a battery module using the above described system for simulating a battery module.

In one embodiment, the method of simulating a battery module according to the present invention includes: setting an inflow and a temperature of a fluid flowing into a tube of a system for simulating a battery module, to thereby apply a predetermined pressure and temperature to a battery cell; and inducing a swelling of the battery cell according to charge and discharge and measuring a pressure inside a case.

The step of applying the pressure and the temperature to the battery cell includes a process of setting the inflow and the temperature of the fluid flowing into the tube by using the fluid supply unit and the temperature controller. In particular, the process of allowing a fluid to flow into the tube and controlling the temperature is to simulate the temperature and pressure of a battery cell at the time of a swelling test in a battery module. At this time, the pressure applied to the battery cell may be changed according to the inflow of the fluid, and the average temperature may be set to be in the range of 20 to 50° C.

In another embodiment, the method further includes setting an inflow and a temperature of a fluid flowing into n tubes as the n tubes are disposed as a single layer on one surface of the battery cell of the system. Herein, the n is an integer equal to or greater than 2.

In a specific embodiment, n tubes are fluidly connected to the fluid supply unit, respectively, and include a valve for controlling the inflow of a fluid flowing into each of the tubes, respectively. Namely, it is possible to differently set pressures applied to respective regions of the battery cell by individually configuring the tube and individually setting the inflow of the fluid flowing into each tube.

Furthermore, the n tubes may include a temperature controller for controlling the temperature of the fluid, respectively. As such, it is possible to differently set temperatures applied to respective regions of the battery cell by individually configuring the tube and individually setting the temperature of the fluid flowing into each tube. Namely, the present invention can simulate a battery module by granting conditions in a module state while changing the temperature and pressure conditions by regions of a battery cell.

Further, the battery module simulation method according to the present invention includes the step of measuring the pressure inside a case. The sensor unit may be disposed between the tube and one surface of the case to thereby measure the internal pressure of the case.

In a specific example, the battery module simulation system of the present invention sets the pressure and the temperature applied to the battery cell by injecting a fluid into the tube and controlling the temperature of the fluid in the tube. Further, the changed pressure in the case can be measured according to the inflow and the temperature of the fluid flowing into the tube.

More specifically, the battery module simulation system of the present invention applies a predetermined pressure and temperature to battery cells accommodated in a case by controlling the inflow and the temperature of the fluid inside the tube with the fluid supply unit and the temperature controller. The swelling of the battery cell is induced by the charge/discharge unit which is electrically connected to the battery cell in a state that pressure and temperature have been applied to the battery cell. Further, the sensor unit can sense the pressure changed by the swelling of the battery cell.

Hereinafter, the present invention will be described in more detail through drawings and examples. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

FIG. 1 is a schematic diagram showing a system for simulating a battery module according to one embodiment of the present invention.

Referring to FIG. 1, a system 100 for simulating a battery module according to the present invention includes: a case 120 which accommodates a battery cell 110 therein; a charge/discharge unit 140 which is electrically connected to the battery cell 110; a tube 130 which is stacked on one surface of the battery cell 110 and has a structure into which a fluid flows; a fluid supply unit 150 which is fluidly connected to the tube 130, and supplies a fluid to the tube 130 to thereby apply pressure to the battery cell 110; a temperature controller 160 which controls a temperature of the fluid which has flowed into the tube 130; and a sensor unit 170 which is disposed between the tube 130 and one surface of the case 120 and measures a pressure inside the case 120.

Further, the battery module simulation system 100 according to one embodiment of the present invention has a structure where first and second compression pads 180 and 180' are disposed on two surfaces of a battery cell 110.

Further, the tube 130 is made of a soft or elastic material, has a flat form so that it can be easily laminated on one surface of a battery cell 110, and has a structure of covering the front surface of the battery cell 110. A fluid or water may flow into the tube 130. Specifically, the pressure applied to the battery cell 110 accommodated in the case 120 may be controlled by allowing water to flow into the tube 130. Further, the tube 130 is laminated on one surface of the first compression pad 180 laminated on the battery cell 110.

The battery module simulation system 100 of the present invention is fluidly connected to the tube and includes a fluid supply unit 150 which supplies a fluid to the tube 130. The fluid supply unit 150 may be a general fluid pump. Further, though not illustrated in FIG. 1, the inflow of the fluid flowing into the tube can be controlled by including a fluid control valve (not shown) between the tube 130 and the fluid supply unit 150.

The battery module simulation system 100 of the present invention includes a temperature controller 160 for controlling the temperature of a fluid which has flowed into the tube 130. The temperature controller 160 may be a heater and may easily control the temperature of the fluid accommodated in the tube to a desired temperature through a temperature sensor attached on the tube 130. Namely, the pressure and the temperature applied to the battery cell can be controlled by controlling the inflow and the temperature of the fluid accommodated in the tube 130.

On the other hand, though not illustrated in the drawings, the temperature controller 160 may be connected to a fluid supply unit 150 and allow a fluid to flow into the tube 130 after controlling the temperature of the fluid supplied to the tube 130.

The battery module simulation system 100 of the present invention includes a sensor unit 170. Specifically, the sensor unit 170 is disposed between the tube 130 and one surface of the case 120 and measures the internal pressure of the case 120. Specifically, the sensor unit 170 includes a pressure sensor having a planar structure. The pressure sensor having the planar structure is disposed on the front surface of the battery tube 130. As such, even if the pressure increases only on a partial region of the entire area of the tube 130 or the battery cell 110, the pressure in the case 120 can be easily sensed.

Specifically, the battery module simulation system 100 of the present invention sets the pressure and the temperature applied to the battery cell 110 by injecting a fluid into the tube 130 and controlling the temperature of the fluid in the tube 130. Further, the changed pressure in the case 120 can be measured according to the inflow and the temperature of the fluid flowing into the tube 130.

More specifically, the battery module simulation system of the present invention applies a predetermined pressure and temperature to the battery cell 110 accommodated in the case 120 by controlling the inflow and the temperature of the fluid in the tube 130 with the fluid supply unit 150 and the temperature controller 160. The swelling of the battery cell 110 is induced by the charge/discharge unit 140 which is electrically connected to the battery cell 110 in a state that the pressure and temperature have been applied to the battery cell 110. Further, the sensor unit 170 can sense the pressure changed by the swelling of the battery cell 110.

Further, the measured pressure value may be outputted in the output unit 190, and the pressure value may be stored in the storage unit 195.

Second Embodiment

Figure 2:
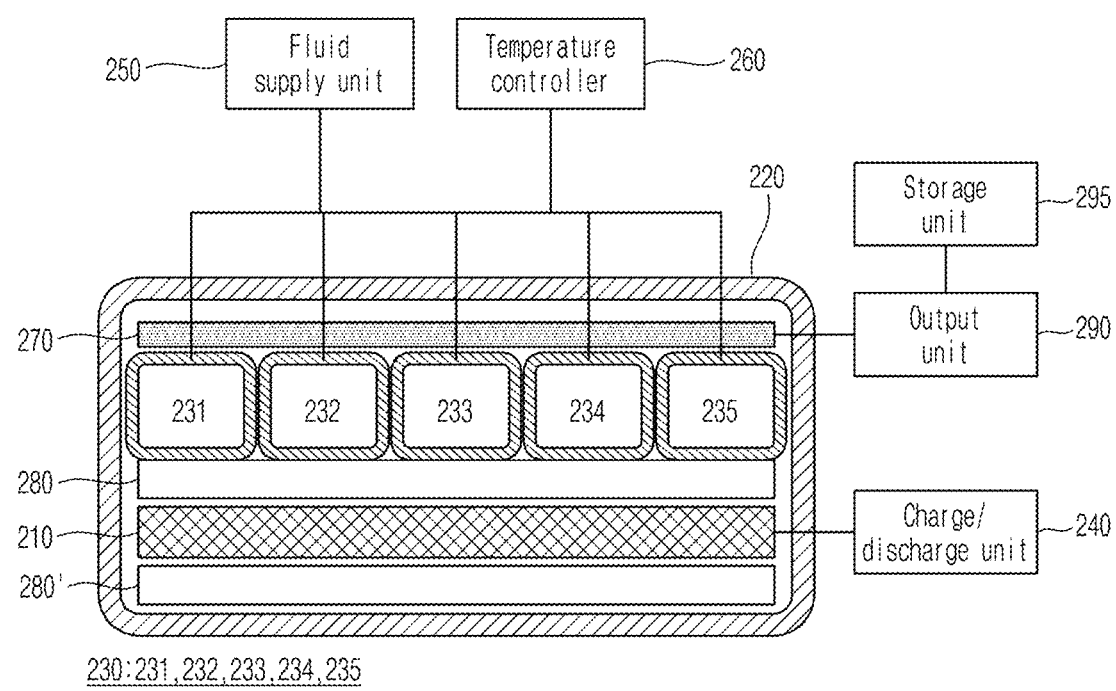
FIG. 2 is a schematic diagram showing a system for simulating a battery module according to another embodiment of the present invention.

FIG. 2 is a schematic diagram showing a system for simulating a battery module according to another embodiment of the present invention.

Referring to FIG. 2, a system 200 for simulating a battery module according to the present invention includes: a case 220 which accommodates a battery cell 210 therein; a charge/discharge unit 240 which is electrically connected to the battery cell 210; a tube 230 which is stacked on one surface of the battery cell 210 and has a structure into which a fluid flows; a fluid supply unit 250 which is fluidly connected to the tube 230, and supplies a fluid to the tube 230 to thereby apply pressure to the battery cell 210; a temperature controller 260 which controls a temperature of the fluid which has flowed into the tube 230; and a sensor unit 270 which is disposed between the tube 230 and one surface of the case 220 and measures a pressure inside the case 220.

Further, the battery module simulation system 200 according to one embodiment of the present invention has a structure where first and second compression pads 280 and 280' are disposed on two surfaces of a battery cell 210.

At this time, the battery module simulation system 200 includes n tubes (n is an integer equal to or greater than 2). FIG. 2 shows that 5 tubes 231, 232, 233, 234 and 235 are included, but the present invention is not limited to this example.

Specifically, the tubes 231, 232, 233, 234 and 235 are arranged as a single layer on one surface of the battery cell 210, and the tubes 231, 232, 233, 234 and 235 are arranged to be distributed on the entire area of the battery cell 210. More specifically, first and second compression pads 280 and 280' are disposed on two surfaces of the battery cell 210, and the tubes 231, 232, 233, 234 and 235 are arranged on one surface of the first compression pad 280.

Meanwhile, the tubes 231, 232, 233, 234 and 235 are fluidly connected to the fluid supply unit 250, and a value (not shown), which controls an inflow of a fluid flowing into the tubes 231, 232, 233, 234 and 235, is provided between the tubes 231, 232, 233, 234 and 235 and the fluid supply unit 250. Namely, the battery module simulation system 200 according to the present invention may differently set pressure applied to each region of the battery cell 210 by individually configuring the tube 230 and individually setting the inflow of a fluid flowing into each tube 230.

Further, the tubes 231, 232, 233, 234 and 235 may include a temperature controller 260 for controlling the temperature of the fluid, respectively. FIG. 2 shows that one temperature controller 260 is included, but the present invention is not limited to this example. Namely, the battery module simulation system according to the present invention may differently set the temperature applied to each region of the battery cell by individually configuring tubes 231, 232, 233, 234 and 235 and individually setting the temperature of the fluid flowing into each of the tubes 231, 232, 233, 234 and 235.

More specifically, the battery module simulation system of the present invention applies a predetermined pressure and temperature to the battery cell 210 accommodated in the case by controlling the inflow and the temperature of the fluid in the tube 230 with the fluid supply unit 250 and the temperature controller 260. The swelling of the battery cell 210 is induced by the charge/discharge unit 240 which is electrically connected to the battery cell 210 in a state that the pressure and temperature have been applied to the battery cell 210. Further, the sensor unit 270 can sense the pressure changed by the swelling of the battery cell 210. Particularly, the present invention can simulate a battery module by granting conditions in a module state while changing the temperature and pressure conditions by regions of a battery cell 210.

Since each component has been described above, the detailed description of each component will be omitted here.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS 100, 200: system for simulating a battery module
110, 210: battery cell
120, 220: case
130, 230: tube
140, 240: charge/discharge unit
150, 250: fluid supply unit
160, 260: temperature controller
170, 270: sensor unit
180, 280: compression pad
190, 290: output unit
195, 295: storage unit

The invention claimed is:

1. A system for simulating a battery module, the system comprising:
   a case configured to accommodate a battery cell therein;
   a charge/discharge unit configured to electrically connect to the battery cell;
   a plurality of tubes configured to be disposed as a single layer on the one surface of the battery cell, each tube including a structure configured for a fluid to flow into;
   a fluid supply unit configured to fluidly connect to the plurality of tubes and configured to supply the fluid to the plurality of tubes to thereby apply pressure to the battery cell;
   a temperature controller configured to control a temperature of the fluid which has flowed into the plurality of tubes; and
   a sensor unit disposed between the plurality of tubes and one surface of the case and configured to measure a pressure inside the case, wherein the system is configured to differently set the temperature applied to each region of the battery cell by individually setting the temperature of the fluid flowing into each of the plurality of tubes.

2. The system of claim 1, wherein each of the plurality of tubes further includes a valve configured to control an inflow of the fluid.

3. The system of claim 1, wherein each of the plurality of tubes includes the temperature controller.

4. The system of claim 1, further comprising:
   an output unit configured to connect to the sensor unit and configured to output a pressure value of an inside of the case; and
   a storage unit configured to store the pressure value.

5. The system of claim 1, wherein the case further includes first and second compression pads configured to be disposed on two surfaces of the battery cell, respectively.

6. The system of claim 1, wherein each of the plurality of tubes further includes a soft or elastic material.

7. The system of claim 1, wherein the fluid flowing into each of the plurality of tubes is in a liquid or gel state.

8. The system of claim 1, wherein the sensor unit includes a pressure sensor having a planar structure.

9. A method of simulating a battery module using the system of claim 1, the method comprising:
   setting an inflow of the fluid and the temperature of the fluid flowing into the plurality of tubes to thereby apply the pressure to a battery cell accommodated by the case and control a temperature of the battery cell; and
   inducing a swelling of the battery cell according to charge and discharge and measuring a pressure inside the case.

10. The method of claim 9, further comprising individually setting the temperature of the fluid flowing into each of the plurality of tubes so as to differently set the temperature applied to each region of the battery cell.

* * * * *